US007900963B2

(12) United States Patent
Jolley

(10) Patent No.: US 7,900,963 B2
(45) Date of Patent: Mar. 8, 2011

(54) ASSEMBLY OF A MOTOR VEHICLE BODY AND A POWER TRAIN AND CHASSIS MODULE

(75) Inventor: Peter Jolley, Warwick (GB)

(73) Assignee: Aston Martin Lagonda Limited, Gaydon (GB)

( * ) Notice: Subject to any disclaimer, the term of this patent is extended or adjusted under 35 U.S.C. 154(b) by 0 days.

(21) Appl. No.: 11/676,829

(22) Filed: Feb. 20, 2007

(65) Prior Publication Data

US 2007/0137919 A1    Jun. 21, 2007

(51) Int. Cl.
   B62D 21/11    (2006.01)
   B62D 24/04    (2006.01)
(52) U.S. Cl. .................. 280/781; 280/124.109
(58) Field of Classification Search ........... 280/124.109, 280/781, 784; 296/187.09, 193.09; 180/232, 180/312
   See application file for complete search history.

(56) References Cited

U.S. PATENT DOCUMENTS

| | | | | |
|---|---|---|---|---|
| 3,899,047 A * | 8/1975 | Maeda et al. | ................. | 188/374 |
| 3,912,295 A * | 10/1975 | Eggert, Jr. | ................. | 280/784 |
| 4,426,101 A * | 1/1984 | Dyer | ................. | 280/788 |
| 4,573,734 A * | 3/1986 | Gass | ................. | 296/187.09 |
| 4,660,345 A * | 4/1987 | Browning | ................. | 52/653.2 |
| 5,036,943 A | 8/1991 | Kashiwagi | | |
| 5,201,566 A * | 4/1993 | Mori | ................. | 296/192 |
| 5,244,248 A * | 9/1993 | Bovellan | ................. | 296/187.09 |
| 5,358,300 A * | 10/1994 | Gray | ................. | 296/192 |
| 5,372,216 A * | 12/1994 | Tsuji et al. | ................. | 180/274 |
| 5,374,081 A * | 12/1994 | Schoderer et al. | ................. | 280/788 |
| 5,882,064 A * | 3/1999 | Emmons | ................. | 296/193.04 |
| 5,915,494 A * | 6/1999 | Matsumura et al. | ................. | 180/232 |
| 6,193,273 B1 * | 2/2001 | Novak et al. | ................. | 280/781 |
| 6,193,274 B1 * | 2/2001 | Brown et al. | ................. | 280/784 |
| 6,269,902 B1 | 8/2001 | Miyagawa | | |
| 6,695,392 B2 * | 2/2004 | Stoffels et al. | ................. | 296/187.09 |
| 6,899,195 B2 * | 5/2005 | Miyasaka | ................. | 180/312 |
| 6,957,846 B2 * | 10/2005 | Saeki | ................. | 296/187.1 |
| 7,163,076 B2 | 1/2007 | Seksaria | | |
| 7,210,733 B2 * | 5/2007 | Mouch et al. | ................. | 296/203.02 |

(Continued)

OTHER PUBLICATIONS

Office Action (Restriction Requirement), U.S. Appl. No. 10/922,698, mailed Jan. 18, 2007, 5 pages.

(Continued)

Primary Examiner — Paul N Dickson
Assistant Examiner — Karen Jane J Amores
(74) Attorney, Agent, or Firm — Dorsey & Whitney LLP

(57) ABSTRACT

A motor vehicle front subframe includes a pair of main longitudinal beams each formed from an extrusion with a flange casting at the rear end and a suspension tower at the other end. Two lower longitudinal beams extend parallel to the main longitudinal beams and are connected by a cross member. Each lower longitudinal beam has a horizontal front flange where it is attached to a corresponding flange face at the lower end of the adjacent suspension tower. Two intermediate longitudinal beams are attached to the suspension towers and to a main cross-member and forward are two crush cans to which is attached a bumper armature. The vehicle has a body with a passenger compartment and vertical pillars just forward of the passenger compartment. Suitable bolts or set screws are then inserted to secure the front subframe to the body and the rear subframe is attached to the body.

9 Claims, 6 Drawing Sheets

U.S. PATENT DOCUMENTS

| | | |
|---|---|---|
| 7,559,402 B2 * | 7/2009 | Jennings et al. .............. 180/312 |
| 2003/0089545 A1 | 5/2003 | Seksaria et al. |
| 2003/0178834 A1 | 9/2003 | Grimm et al. |
| 2005/0061573 A1 | 3/2005 | Mizuno et al. |
| 2005/0082782 A1 * | 4/2005 | Jolley .................... 280/124.109 |
| 2008/0122213 A1 * | 5/2008 | Xu et al. ....................... 280/781 |

OTHER PUBLICATIONS

Response to Restriction Requirement, U.S. Appl. No. 10/922,698, filed Feb. 16, 2007, 1 page.

Office Action, U.S. Appl. No. 10/922,698, mailed Mar. 14, 2007, 7 pages.

* cited by examiner

ASSEMBLY OF A MOTOR VEHICLE BODY AND A POWER TRAIN AND CHASSIS MODULE

RELATED APPLICATIONS

This application claims benefit of priority of U.S. application Ser. No. 10/922,698, filed Aug. 20, 2004, now abandoned and United Kingdom Application No. 0319493.3, filed Aug. 20, 2003, hereby incorporated by reference in their entirety.

BACKGROUND OF THE INVENTION

1. Field of the Invention

This invention relates to motor vehicles, methods of making motor vehicles and to certain components of such vehicles.

2. Description of Related Art

Many passenger cars use a longitudinally arranged engine and transmission, where the transmission is located at the front of the vehicle with a rear mounted final drive that is connected to the transmission through a propshaft. It is common for passenger vehicles to use a torque tube to rigidly connect the engine and the transmission: the torque tube having a drive shaft running though it to transmit the drive from the engine to the transmission. Still the passenger compartment must be protected during frontal crashes. Most passenger cars use a front-end structure that is deformable in the longitudinal direction and absorbs energy during crash. The problem with such an energy absorbing front-end structure is that the engine cannot be easily fitted to the vehicle once the structure is in place. This problem is more significant when the structure is in sports cars.

One objective of the present invention is to provide a vehicle design in which the engine and front subframe can be easily assembled in the vehicle. The vehicle should have an engine mounted in a front subframe, a torque tube attached to the rear of the engine which extends longitudinally across the vehicle, and a rear final drive assembly attached to a rearward end of the torque tube which drives the rear wheels of the vehicle. Another objective of the present invention is to provide a front subframe which can be adjusted for use in a variety of vehicles and engines without requiring substantial changes to parts or tooling.

SUMMARY OF THE INVENTION

Accordingly, it is the advantage of the present invention to disclose a motor vehicle with passenger compartment, a subframe that supports the rear suspension and engine, a torque tube rigidly attached to the engine, and a power train and chassis module that simplify motor vehicle assembly.

It is further the advantage of the present invention to disclose a method for manufacturing a motor vehicle with passenger compartment that includes a subframe which supports the rear suspension and engine, a torque tube rigidly attached to the engine, and a power train and chassis module.

It is the advantage of the present invention to provide a subframe with front, main and intermediate longitudinal beams that vary in length according to the type of motor vehicle used.

It is moreover, the advantage of this invention to determine the dimension of certain module components by the required length of longitudinal members.

According to a first aspect of the invention there is provided a motor vehicle having a power train and chassis module, said module including a front subframe for the suspension of front wheels of the vehicle and having a rear vertical mounting face, an engine mounted in the front subframe, a torque tube rigidly attached to the rear of the engine and extending longitudinally of the vehicle, a rear final drive assembly for driving rear wheels of the vehicle rigidly attached to a rearward end of the torque tube, a rear subframe for the suspension of the rear wheels and mounted on the rear final drive assembly and a body defining a passenger compartment and supporting two vertical members, each having a forward-facing attachment face by which the respective vertical member is attached to the front subframe through the rear vertical mounting face and rear body mountings on the rear subframe for supporting the rear end of the body.

Preferably, the front subframe also comprises a front cross member, a pair of suspension towers each for supporting the weight of the vehicle on a front wheel, a pair of main longitudinal beams each having at its rear end a flange member defining the rear vertical mounting face and at its front end a respective one of the suspension towers and a pair of front longitudinal beams of a uniform hollow cross-section each connected at its rear end to a respective one of the suspension towers and at its front end to the front cross member. The front subframe may further comprise a pair of intermediate longitudinal beams each interposed between a respective one of the suspension towers and a respective one of the front longitudinal beams.

As described immediately above, the front subframe of a motor vehicle according to the first aspect of the invention is novel. Thus the invention also provides, according to a second aspect thereof, a front subframe of a motor vehicle, the subframe comprising a pair of main longitudinal beams each having at its rear end means for mounting to a vehicle body and at its other end a respective suspension tower for supporting the weight of the vehicle on a front wheel, a pair of front longitudinal beams of a uniform hollow cross-section each connected at its rear end to a respective one of the suspension towers and at its front end to a front cross member, and a pair of intermediate longitudinal beams, each intermediate longitudinal beam being interposed between a respective one of the suspension towers and a respective one of the front longitudinal beams.

Preferably, the front subframe further comprises a main cross-member interposed between the suspension towers and the front longitudinal beams. In a preferred arrangement, the main cross-member is interposed between the intermediate longitudinal beams and the front longitudinal beams.

The front subframe may further comprise a pair of lower longitudinal beams which extend below and parallel to the main longitudinal beams, each lower longitudinal beam having at its rear end means for mounting to the vehicle body and being attached at its front end to the respective suspension tower. Preferably, the means for mounting each lower longitudinal beam to the vehicle body comprises a flange for connection to a respective one of the forward-facing attachment faces. Each lower longitudinal beam may be attached to the respective suspension tower at a horizontal flange.

The front subframe, where it also comprises a front cross member, a pair of suspension towers, a pair of main longitudinal beams and a pair of front longitudinal beams as previously described, may be adapted to a variety of vehicles without extensive modification. Thus, the invention also provides, according to a third aspect thereof a series of motor vehicles, each according said one aspect of the invention where the front subframe also comprises a front cross member, a pair of suspension towers, a pair of main longitudinal beams and a pair of front longitudinal beams as set forth above, the series including one type of motor vehicle in which the or each pair of said longitudinal beams is of one respective length and another type of motor vehicle in which at least one of the corresponding pairs of longitudinal beams is of another length. The invention also provides, according to a fourth aspect thereof, a method of manufacturing a series of motor vehicles, each according said one aspect of the invention where the front subframe also comprises a front cross member, a pair of suspension towers, a pair of main longitudinal beams and a pair of front longitudinal beams as set forth above, the method comprising the manufacture of one type of motor vehicle in the series with the or each pair of front longitudinal beams of one respective length and the manufacture of another type of motor vehicle in the series with at least one of the corresponding pairs of longitudinal beams of another length. The difference in length between the or each pair of longitudinal beams in one type and the or each corresponding pair of longitudinal beams in the other type can be used to vary, as between the one type and the other, the distance between the forward-facing attachment face and the front cross member.

Where the main cross-member is interposed between the intermediate longitudinal beams and the front longitudinal beams, the intermediate longitudinal beams in said one type of motor vehicle may be of one length and in said other type of motor vehicle the intermediate longitudinal beams may be of another length so as to vary, as between the one type and the other, the distance between the forward-facing attachment face and the main cross member. This enables the use of engines of different lengths. In a variation of such a series, the difference in length between the or each pair of longitudinal beams in one type and the or each corresponding pair of longitudinal beams in the other type is used to vary, as between the one type and the other, the distance between the forward-facing attachment face and the main cross member without substantially varying the distance between the forward-facing attachment face and the front cross member.

The motor vehicle according to said first aspect of the invention also lends itself to a novel method of assembly. Thus, the invention also provides, according to a fifth aspect thereof, a method of assembling a motor vehicle according to said first aspect and including the steps of assembling the body to the power train and chassis module by lowering the body vertically with a clearance gap between the attachment faces of the vertical members and the rear vertical mounting faces until the body rests on the rear body mountings, moving the body forward relative to the power train and chassis module to close the clearance gap and securing the body to the power train and chassis module at the rear vertical mounting faces and the rear body mountings These and other objects, features, and advantages of the present invention will become apparent from a reading of the following detailed description with reference to the accompanying drawings, in which:

DETAILED DESCRIPTION

Figure 1:
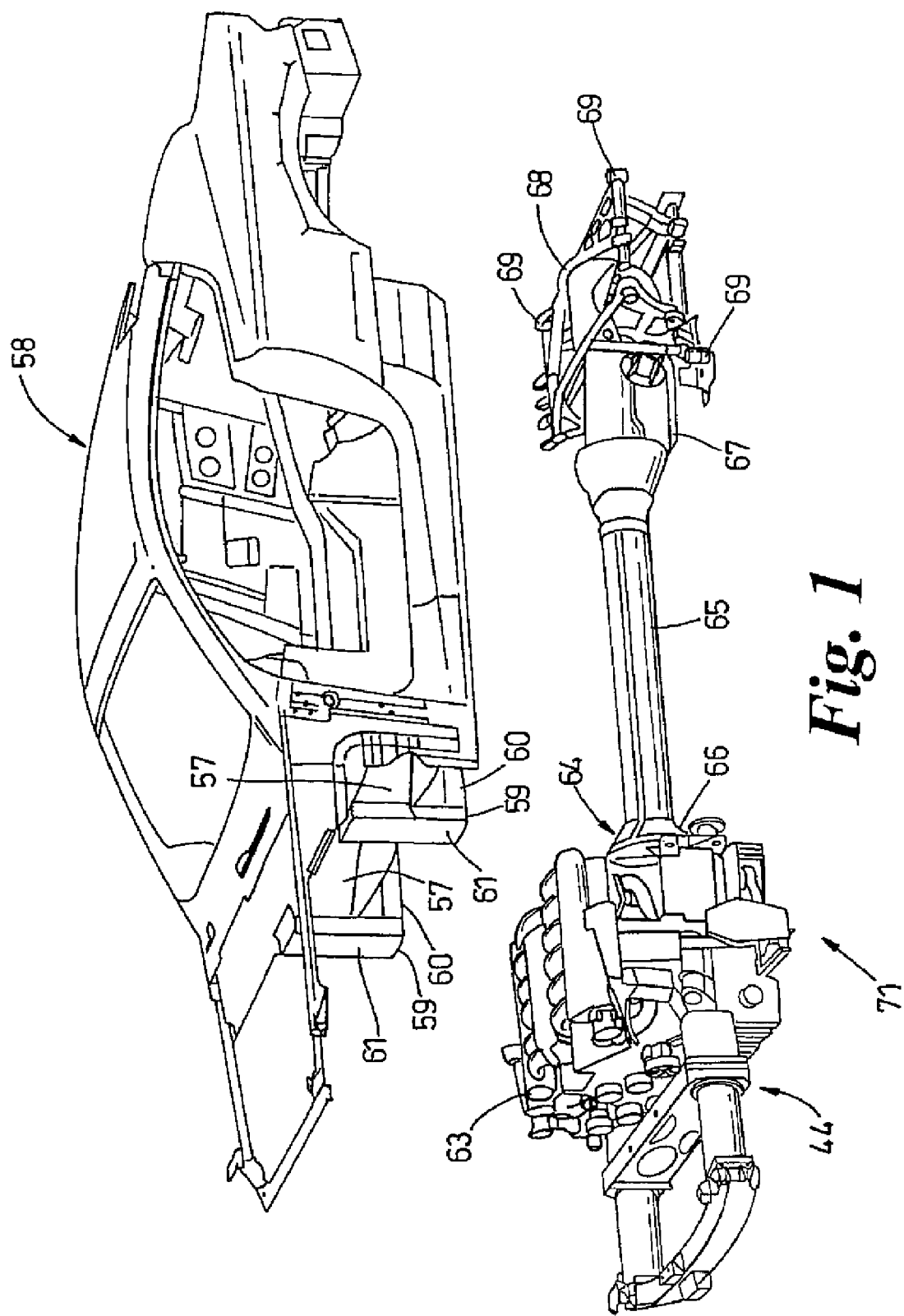
FIG. 1 is a perspective view of the assembly of a motor vehicle body to a power train and chassis module.
Figure 2:
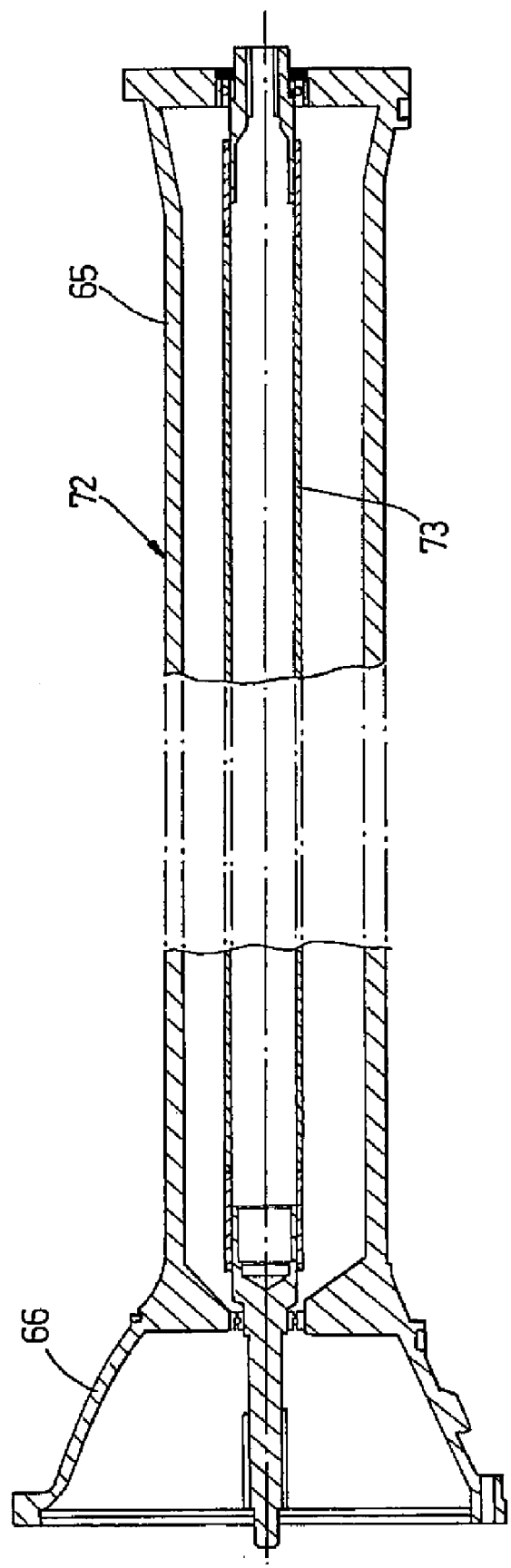
FIG. 2 is a longitudinal cross-section of the bell housing and torque tube shown in FIG. 1.

Referring now to the drawings, FIG. 1 shows a motor vehicle that has a vehicle body 58 with passenger compartment. As shown in FIG. 1, the body 58 is being assembled to a power train and chassis module 71 which comprises a powertrain assembly 64 and front and rear subframes 44, 68. The powertrain assembly 64 includes an engine 63, a longitudinally extending torque tube 65 attached to the rear of the engine by a bell housing 66 and a rear transmission and final drive assembly or transaxle 67 attached to a rearward end of the torque tube 65 for driving rear wheels of the vehicle. The torque tube 65 and the bell housing 66 are formed as a single casting and form part of a torque tube and drive shaft assembly 72 as seen more clearly in FIG. 2. The torque tube and the bell housing casting rigidly connects the block of the engine 63 and to the casing of the transaxle 67 while a drive shaft 73 carried in bearings within the torque tube 65 can transmit power from the engine 63 to the transaxle 67 and to the rear wheels of the vehicle. The transaxle 65 has the rear subframe 68 are attached to it for the suspension of the rear wheels: this being a tubular fabrication having mounting points 69 for the rear of the body 58.

Figure 3:
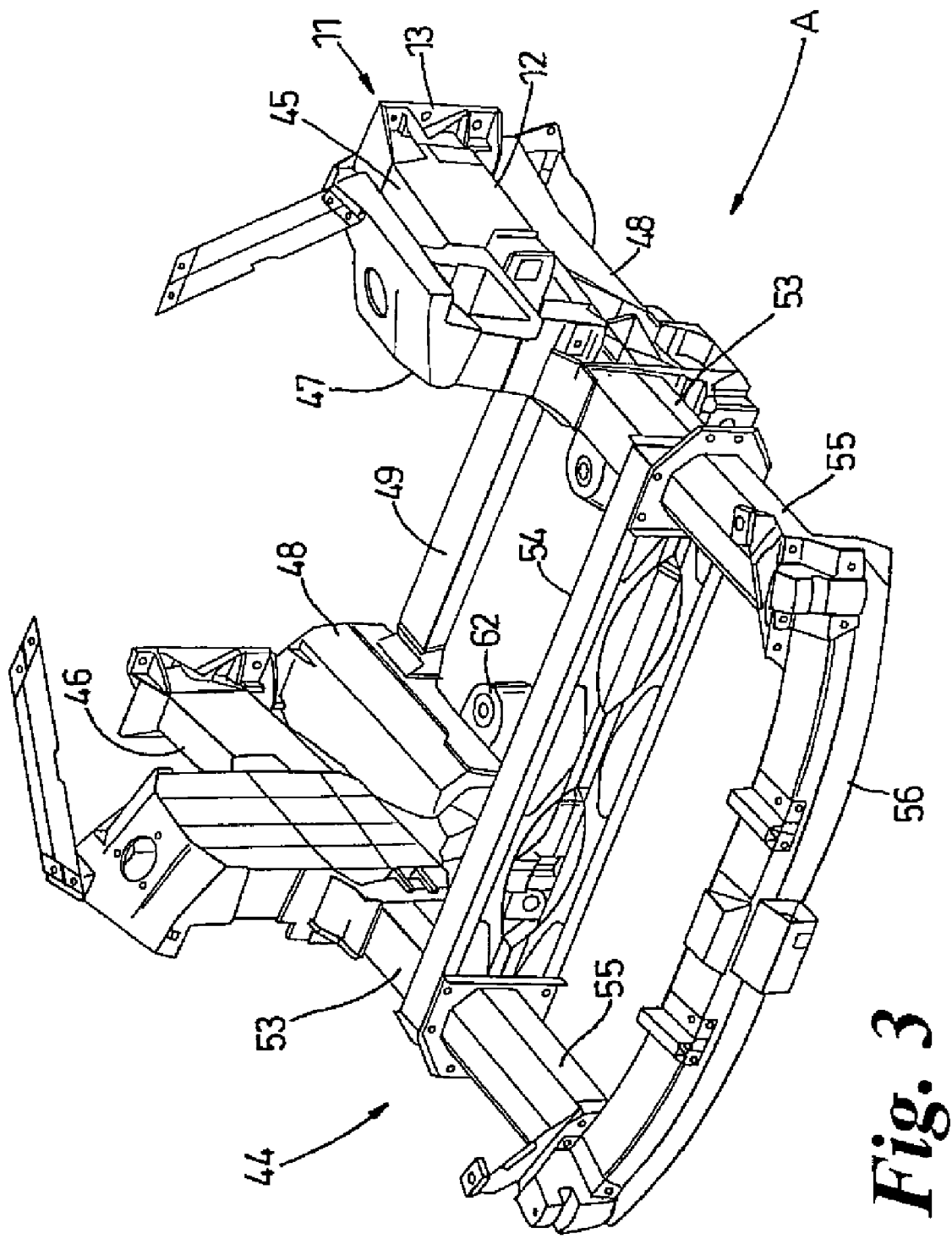
FIG. 3 is a perspective view showing the front subframe of the power train and chassis module shown in FIG. 1.

The front subframe 44, as shown in FIG. 3, comprises a pair of main longitudinal beams 45, 46 each formed from an extrusion 12 with a flange casting 13 at the rear end and a suspension tower 47 at the other end. Each suspension tower 47 is fabricated from castings and extrusions and, in a conventional manner, and supports the weight of the vehicle on a respective front wheel through a suspension strut. A pair of lower longitudinal beams 48, formed as castings, extend parallel to the main longitudinal beams 45, 46 and are connected by an extruded cross member 49 welded to the lower beams 48. Each lower longitudinal beam 48 has a vertical rear flange 51 and an effectively horizontal front flange 52 where it is attached to a corresponding flange face at the lower end of the respective suspension tower 47. The front flange 52 is interrupted by a half-moon recess, which is complemented by a corresponding recess in the suspension tower 47 to provide an aperture for a track rod of a steering linkage.

Extending in front of the suspension towers 47 are two intermediate longitudinal beams 53, each having a rear vertical flange for attachment to the corresponding suspension tower 47 and a front vertical flange attached to a main cross-member 54. In front of the main cross member 54 and the flange mounted to it are two front longitudinal beams or crush cans 55 to which is attached a front cross member 56 which acts as a bumper armature. The front longitudinal beams 55 and the intermediate longitudinal beams 53 are of uniform hollow section, e.g., extrusions. The suspension tower 47, as better shown in FIG. 4, supports the weight of the vehicle at the front end through suspension struts and has mountings for pivot bushes of an upper wishbone link of a double wishbone type suspension. Each lower longitudinal beam 45, 46 has mounting pivot points for a lower suspension arm of the conventional L-type.

Figure 5:
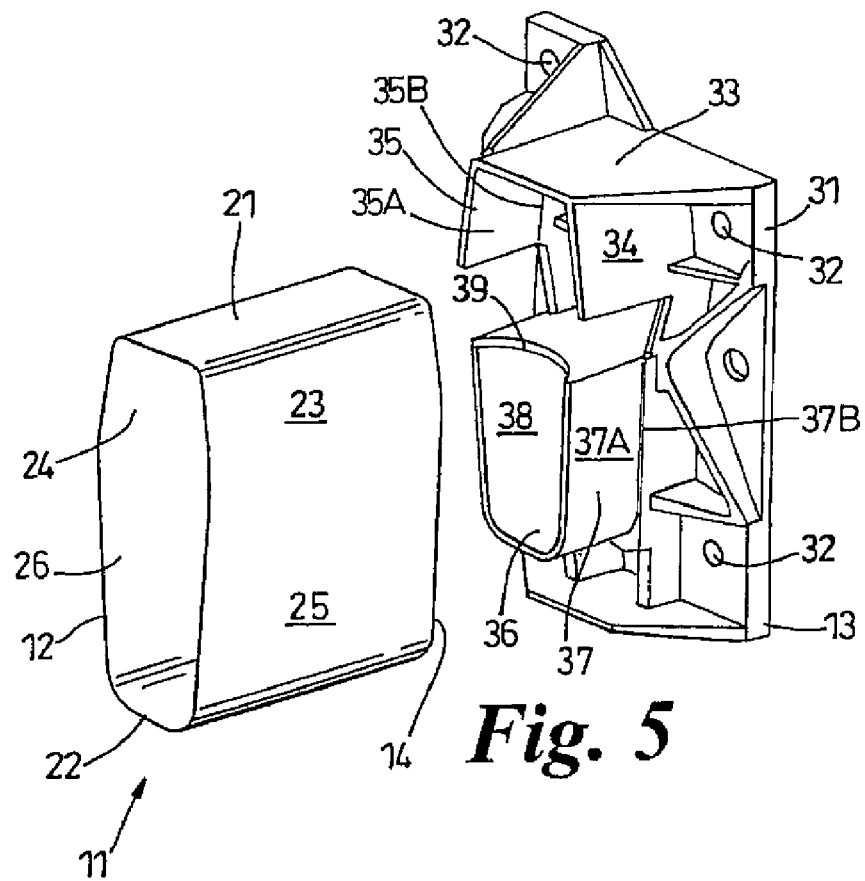
FIG. 5 is a perspective view of a hollow extruded member and a flange casting prior to forming a joint assembly of the front subframe shown in FIGS. 1, 3 and 4.
Figure 6:
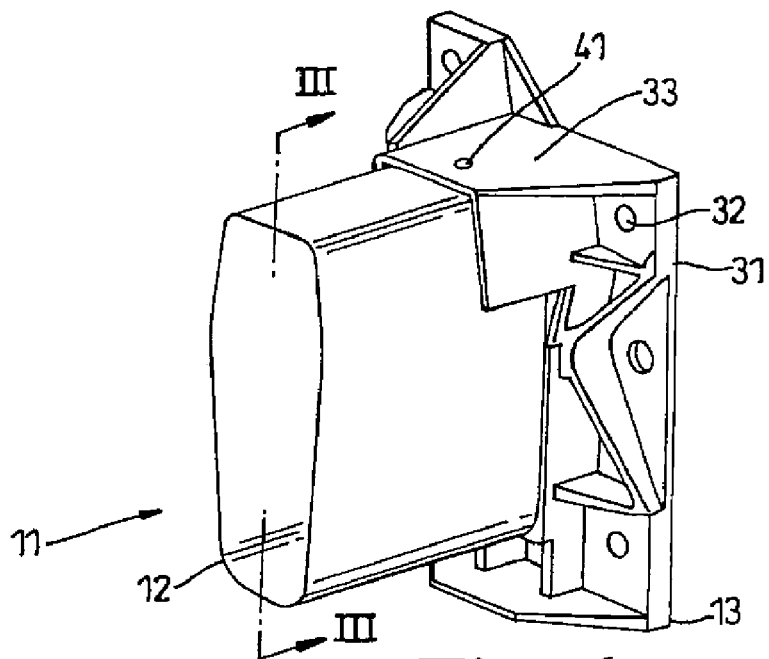
FIG. 6 is a perspective view of the components shown in FIG. 5 in the assembled position.

FIGS. 5 and 6 show how the extrusion 12 is joined to the flange casting 13. The extrusion 12 has a perpendicular end face 14 and has a uniform cross-sectional area throughout. The section of the extrusion 12 can be considered to be formed of six wall portions; a top wall portion 21, a bottom wall portion 22, upper side portions 23, 24 and lower side portions 25, 26. The flange casting 13 comprises a base flange 31, which extends perpendicularly to the extrusion 12 and is provided with attachment holes 32 and several webs which extend perpendicularly from the base flange 31 towards the extrusion 12. Of these webs, a top web 33 and upper side webs 34, 35 have joint faces 33A, 34A, 35A which are presented to corresponding joint areas on the outside of the top wall portion 21 and the upper side wall portions 23, 24 of the extrusion 12 while a bottom web 36 and lower side webs 37, 38 have joint faces 36A, 37A, 38A which are presented to corresponding joint areas on the inside of the bottom wall portion 22 and the lower side wall portions 25, 26 of the extrusion.

Other webs on the flange casting 13 are provided for strength and stiffening, notably a lateral web 39 which extends between the upper ends of the lower side webs 37, 38 so that the lateral web 39, the lowers side webs 37, 38 and the bottom web 36 form a box section. All of the webs are tapered, i.e. have draft angles as is consistent with good casting design. However, the joint faces 33A, 34A, 35A 36A, 37A, 38A extend parallel to the corresponding joint areas of the extrusions, each joint face extending only partly towards the base flange 31 and forming a respective step 33B, 34B, 35B, 36B, 37B, 38B where it adjoins the tapered part of the web 33, 34, 35 36, 37, 38.

To assemble the joint assembly 11, an adhesive is applied to the joint faces 33A, 34A, 35A, 36A, 37A, 38A. The extrusion 12 is then aligned with the flange casting 13 but offset vertically as seen in FIGS. 1, 3 and 5 so that the flange casting 13 is higher than the extrusion. The extrusion 12 is then moved longitudinally towards the flange casting 13 to the full extent permitted by abutment of the extrusion end face 14 with the steps 33B, 34B, 35B, 36B, 37B, 38B to bring the joint faces 33A, 34A, 35A, 36A, 37A, 38A into overlapping alignment with the corresponding joint areas on the extrusion 12, there being a substantial clearance due to the vertical offset so that the adhesive on the joint faces does not contact the joint areas on the extrusion at this stage. Then the extrusion 12 is moved transversely relative to the flange casting 13, i.e. upwards as seen in FIG. 1, so that each joint face 33A, 34A, 35A, 36A, 37A, 38A, complete with the adhesive, is brought into contact with its corresponding joint area on the extrusion 12. Holes are then drilled or pierced and blind rivets 41, e.g. as sold under the trade mark MONOBOLT, are then inserted, the self-tightening action of the rivets helping to ensure full contact of the adhesive with the joint areas. The suspension tower 47 has webs which are substantially similar to those of the flange casting 13 and thus the assembly of extrusion 12, flange casting 13 and suspension tower 47 is then placed in an oven to cure the adhesive. A suitable adhesive is Dow (trade mark) BETAMATE XD4600 (trade mark) while the extrusion 12, flange casting 13 and suspension tower 47 may be anodised aluminium alloy.

The body 58 has two vertical members or pillars 59, each having a forward-facing attachment face 61 to receive the main longitudinal beams 45 at corresponding rear vertical mounting faces on the flange castings 13 and the rear flange 51 of the lower longitudinal beams 45. The lower longitudinal beams 45 have mounting holes 62 for engine mountings to support the engine 63. The pillars 59 are each supported just forward of the passenger compartment by a respective pair of triangulated supports 57 and a respective lower longitudinal member 60.

The body 58 is assembled to the power train and chassis module 71 by lowering the body with a clearance gap (e.g. 10 mm) between the front face 61 of the vertical pillars 59 and the rear faces of the flanges 13 and 51 until the various fixing holes in the flanges 13 and 51 align with those in the pillars. The body 58 is then moved forward to close the gap between the flanges 13 and 51 and the pillars 59. Suitable bolts or set screws are then inserted to secure the front subframe 44 to the body 58 and the rear subframe 68 is attached to the body at the mounting points 69.

The weight of the body 58 is supported at its front end by the joint assembly 11 such that a compressive load is taken through the webs of the flange casting 13 onto the extrusion 12, thereby avoiding tensile loading. The rivets 41 are mainly for assembly purposes, i.e. during curing of the adhesive. In the extreme loading case of a front-end collision, the extrusion 12 is put under an extreme compression load. Nevertheless, the joint assembly 11 is able to support such loads because these are reacted directly by the abutment of the extrusion end face 14 with the steps 33B, 34B, 35B, 36B, 37B, 38B in the webs 33, 34, 35, 36, 37, 38. The longitudinal extrusions 55, 53 and 12 are designed to collapse in a controlled manner in such collisions; the crush cans 55 first, then the intermediate beams 53 and then the extrusions 12 of the main longitudinal beams 45, 46. Depending on the severity of the collision, it may be that only the crush cans 55 are compressed or just the crush cans 55 and the intermediate beams 53. In the most severe collisions when the main extrusions 12 collapse, the pillars 59 buckle and the lower longitudinal member 60 on the body 58 would also collapse at the same time.

The power train and chassis module 71 may be used in a series of motor vehicles, the series including one type of motor vehicle in which the pairs of longitudinal beams 45, 46, 48, 53, 55 are of one respective length and another type of motor vehicle in which at least one of the corresponding pairs of longitudinal beams is of another length. This can be used to vary the distance between the forward-facing attachment face 61 and the front cross member 56. Alternatively or additionally, such a series may include one type of motor vehicle in which the intermediate longitudinal beams 53 are of one length and another type of motor vehicle in which the intermediate longitudinal beams are of another length to vary the distance between the forward-facing attachment face 61 and the main cross member 54 and thereby vary the distance between the forward-facing attachment face 61 and the front cross member 56. Furthermore, there may be one type of motor vehicle in which the intermediate longitudinal beams 53 are of one length and an other type of motor vehicle in which the intermediate longitudinal beams are of another length so as to vary the distance between the forward-facing attachment face 61 and the main cross member 54 without substantially varying the distance between the forward-facing attachment face and the front cross member 56 the length of the crush cans 55 being varied accordingly. This is illustrated in FIG. 7 as compared to FIG. 4.

Figure 4:
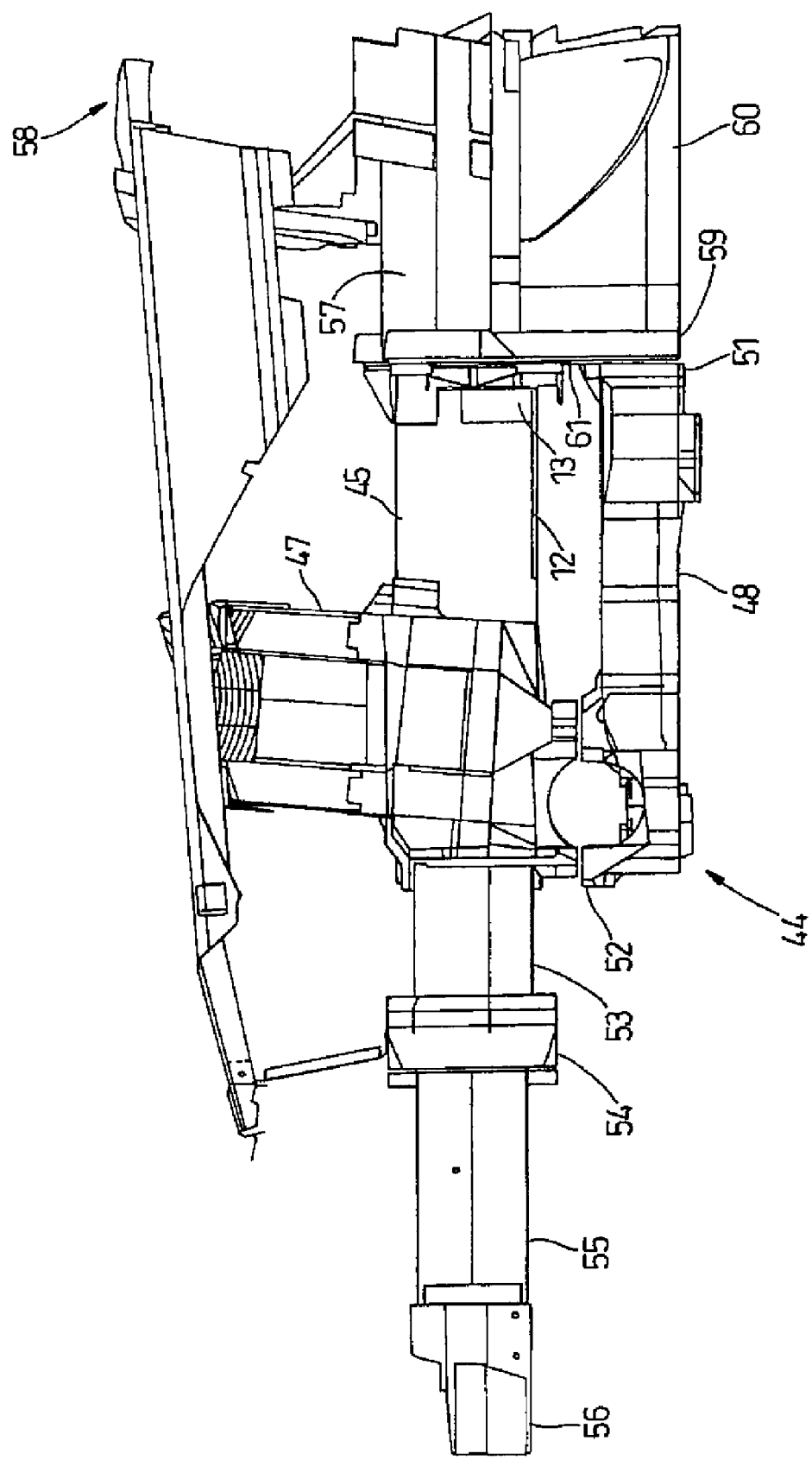
FIG. 4 is a side view of the vehicle body labelled "A" in FIG. 3.
Figure 7:
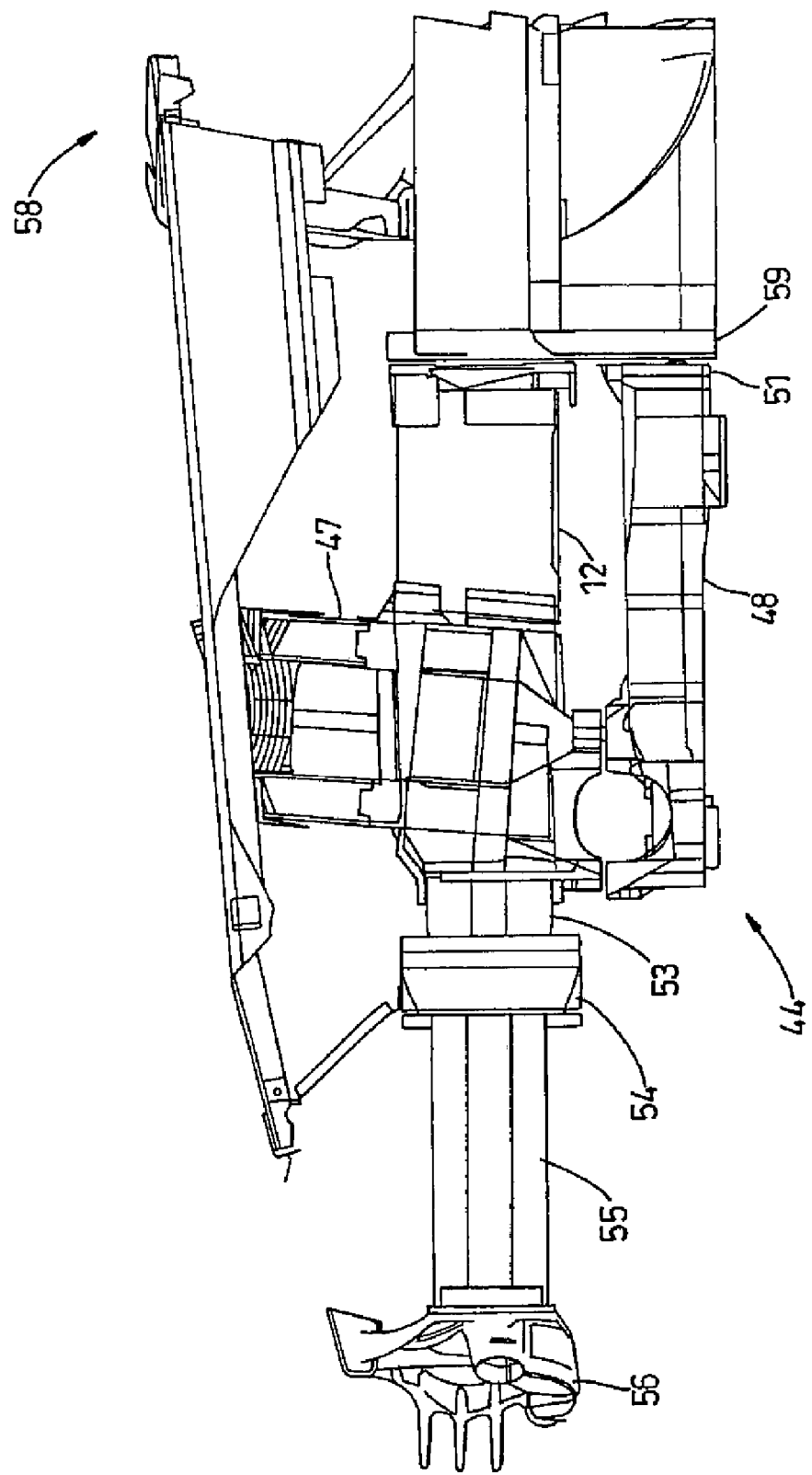
FIG. 7 shows a front subframe similar to that shown in FIGS. 2 through 4 but used for another type of vehicle.

In FIG. 7, the main extrusions 12, the lower longitudinal beams 48 and the suspension towers 47 are very similar to the corresponding components shown in FIG. 4 while the intermediate extrusions 53 are shorter in FIG. 7 than in those shown in FIG. 4 and the crush cans 55 are longer. Not only does this allow for a variation in the positioning of the front cross-member 56 between two types of vehicle by altering the distance from the front face of the body 58 to the front of the crush cans 55, but it also allows for different engines, e.g. a shorter engine can have the main cross-member 54 closer to the body 58 and allow longer crush cans 55. Furthermore, the connection of the front subframe 44 to the body at a vertical plane formed by the front faces of the pillars 59 allows the whole front end to be removed and replaced easily, even for engine replacement. Alternatively, for engine replacement alone the main cross-member 54 can be removed, together with the components of the front subframe forward of this, i.e. the crush cans and the front cross-member 56.

The connection of the front subframe 44 to the body at a vertical plane formed by the front faces of the pillars 59 also allows a variation in the front suspension height relative to the body, allowing for variation between vehicle types and even for small adjustment for special purposes, e.g. racing. This is illustrated by further comparison of FIG. 7 with FIG. 4, the body 58 in FIG. 7 being slightly lower than in FIG. 4.

What is claimed is:

1. A front subframe of a motor vehicle, the subframe comprising a pair of main longitudinal beams each having at its rear end means for mounting to respective longitudinal members that support a vehicle body and at its other end a respective suspension tower for supporting the weight of the vehicle on a front wheel, a pair of front longitudinal beams of a uniform hollow cross-section each connected at its front end to a front cross member, a pair of intermediate longitudinal beams, each intermediate longitudinal beam being interposed between a respective one of the suspension towers and a respective one of the front longitudinal beams, and a pair of lower longitudinal beams which extend below and parallel to the main longitudinal beams, each lower longitudinal beam having at its rear end means for mounting to the vehicle body and being attached at its front end to the respective suspension tower.

2. A front subframe a motor vehicle, the subframe comprising a pair of main longitudinal beams each having at its rear end means for mounting to respective longitudinal members that support a vehicle body and at its other end a respective suspension tower for supporting the weight of the vehicle on a front wheel, a pair of front longitudinal beams of a uniform hollow cross-section each connected at its front end to a front cross member, and a pair of intermediate longitudinal beams, each intermediate longitudinal beam being interposed between a respective one of the suspension towers and a respective one of the front longitudinal beams, wherein the means for mounting comprise respective vertical mounting faces, wherein the vertical mounting faces are defined by respective flange members.

3. The front subframe of claim 2 further comprising a pair of lower longitudinal beams that extend below and parallel to the main longitudinal beams and include respective vertical rear flanges.

4. The front subframe of claim 3 wherein the respective vertical rear flanges and the respective vertical mounting faces are in a same vertical plane for mounting.

5. The front subframe of claim 1 wherein the means for mounting to respective longitudinal members comprise respective vertical mounting faces.

6. The front subframe of claim 5 wherein the vertical mounting faces are defined by respective flange members.

7. The front subframe of claim 1 wherein the means for mounting to the vehicle body comprise respective vertical rear flanges.

8. The front subframe of claim 7 wherein the means for mounting to respective longitudinal members comprise respective vertical mounting faces and wherein the respective vertical rear flanges and the respective vertical mounting faces are in a same vertical plane for mounting.

9. The front subframe of claim 1 wherein the lower longitudinal beams include respective effectively horizontal front flange faces at their front ends attached to the respective suspension tower.

* * * * *